| | | |
|---|---|---|
| (12) | United States Patent <br> Bailey et al. | (10) Patent No.: US 6,182,582 B1 <br> (45) Date of Patent: Feb. 6, 2001 |

(54) TILT TABLE

(75) Inventors: David Arthur Bailey, Glendale; Robert Edward Winkel, Jr., Phoenix, both of AZ (US)

(73) Assignee: Honeywell International Inc., Morristown, NJ (US)

( * ) Notice: Under 35 U.S.C. 154(b), the term of this patent shall be extended for 0 days.

(21) Appl. No.: 09/340,971

(22) Filed: Jun. 28, 1999

(51) Int. Cl.⁷ ..................................... A47B 57/00
(52) U.S. Cl. ................................. 108/94; 108/22
(58) Field of Search ................... 108/20, 21, 22, 108/94; 74/1, 16, 89.15; 248/425, 371

(56) References Cited

U.S. PATENT DOCUMENTS

| | | | | |
|---|---|---|---|---|
| 3,155,383 | * | 11/1964 | Whitmore | 108/20 X |
| 3,486,629 | * | 12/1969 | Slaga | 108/20 X |
| 3,572,680 | * | 3/1971 | Neff | 108/20 X |
| 4,656,951 | * | 4/1987 | Kimura et al. | 108/20 |

* cited by examiner

*Primary Examiner*—Jose V. Chen
(74) *Attorney, Agent, or Firm*—Charles J. Ungemach

(57) ABSTRACT

Two wedge-shaped platforms, each rotatable about a different axis, are rotationally mounted together so that a pointing device mounted on one of the platforms can be made to point in a desired direction by predetermined rotational positioning of the two platforms.

10 Claims, 1 Drawing Sheet

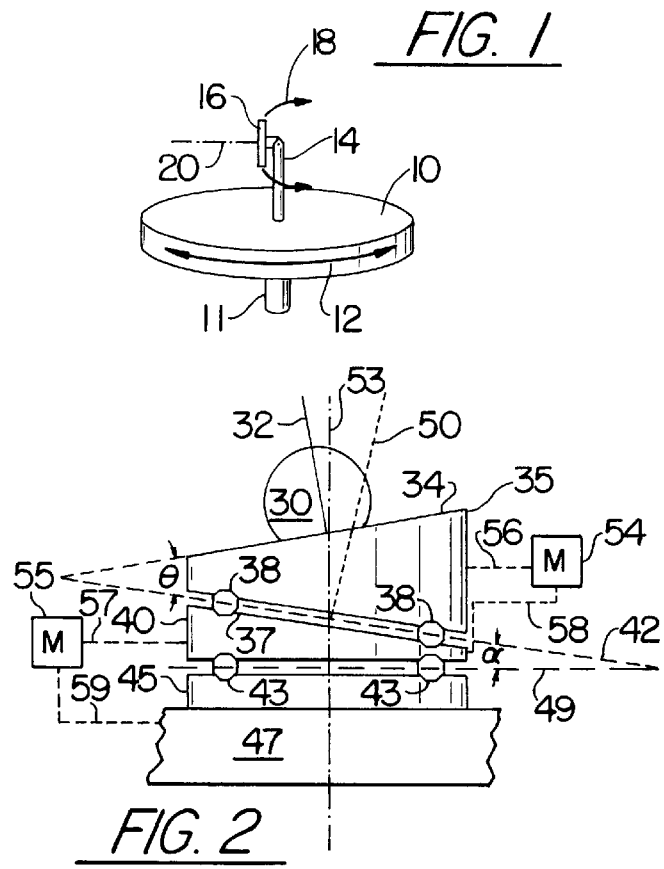
FIG. 1
FIG. 2
FIG. 3
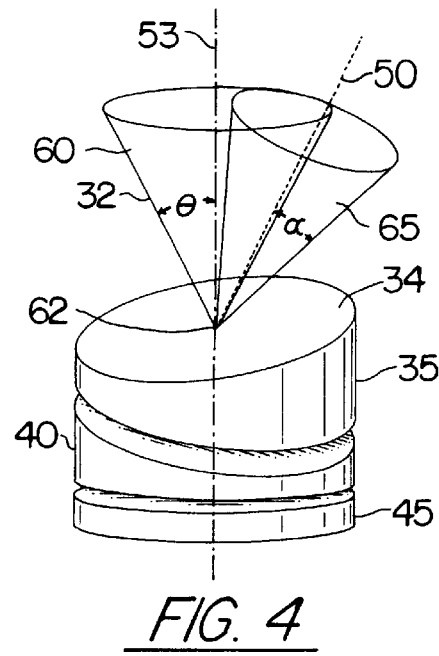
FIG. 4
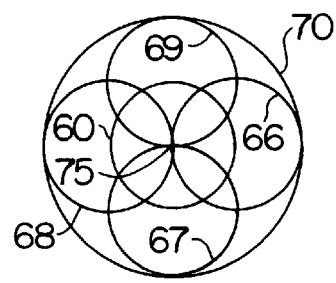
FIG. 5
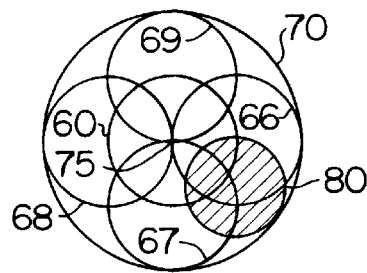
FIG. 6

TILT TABLE

BACKGROUND OF THE INVENTION

1. Field of the Invention

The present invention relates to tilt tables and, more particularly, to pointing platforms which require tilting in two axes so that a line perpendicular to the surface of the platform can be made to point anywhere within a predetermined conical area.

2. Description of the Prior Art

There are a number of devices available in the prior art to provide pointing in any direction, usually with use of two mutually interactive hinges. A simplified example of such a prior art arrangement is shown in FIG. 1.

In FIG. 1, a horizontally arranged first table 10 is shown to be rotatable in the direction of arrows 12. Mounted in the center of table 10 is a bracket 14 which carries a second table 16 shown by rotatable in directions shown to be arrows 18. It will be seen that an axis 20 perpendicular to second table 16 can be made to point in almost any direction by a combination of rotating table 10 and table 16.

There are problems with the operation of devices constructed similar to the structure of FIG. 1 due to the requirement that mounting bracket 14 requires a certain length so that table 16 does not interfere with table 10 at any point in the positioning thereof. In the interest of maintaining a required stiffness, this added length results in a weight penalty. There is also a problem when apparatus like FIG. 1 is to be used in space since the whole mechanism needs to be carefully locked to prevent damage due to forces occurring during the extreme conditions encountered at takeoff. It will be observed that the length of shafts 11 and 14 provide a lever arm that can produce a severe moment on the platforms 10 and 16 when the enormous forces acting during lift-off of a satellite occur. This also requires that the pointing platforms be robust and heavy. Another problem is the conduction of heat since the pivots used in the apparatus like FIG. 1 are generally poor heat conductors, and therefore, in situations where heat conduction is necessary, the spacecraft needs greater ability to limit temperature.

BRIEF DESCRIPTION OF THE INVENTION

The present invention overcomes the problems encountered in the prior art by utilizing a plurality of wedge-shaped platforms mounted on low friction joints, each of which is independently driven to cause rotary motion about a different axis and provide a precise amount of tilt freedom with the result that the direction of the line perpendicular to the table can be set very accurately. The accuracy of pointing is in accordance with the pricision machining of the angle of the wedge shape and the precision of the rotary motion. Further, the equipment may be more easily locked, and there are no long mounting arms, which would provide angular moments acting on the tables during lift-off. The wedges and the low friction mounts are good conductors of heat.

BRIEF DESCRIPTION OF THE DRAWINGS

FIG. 1 is a simplified showing of a prior art tilt table;

FIG. 2 is a side view of one embodiment of the present invention;

FIG. 3 is a side view of an alternate embodiment of the present invention;

FIG. 4 shows the variation of the pointing direction with the structures of FIGS. 2 and 3;

FIG. 5 is a diagram showing the area covered by the pointing direction of the present invention; and FIG. 6 is a diagram like FIG. 5 with the avoidance of a singularity.

DETAILED DESCRIPTION OF THE PREFERRED EMBODIMENTS

Although the invention may be used in many environments and with many different kinds of apparatus that might require angular positioning, such as reaction wheels, momentum wheels, telescopes, antennas, thrusters, etc., the present invention will be shown in connection with a reaction wheel for use in a space environment.

In FIG. 2, a reaction wheel assembly or RWA 30 is shown having a pointing axis 32 and is mounted to the upper surface 34 of a first rotatable wedge-shaped platform or disk 35. Platform 35 is mounted, by low friction rotatable mountings such as balls 38, to the upper surface 37 of a second wedge-shaped platform or disk 40. It is seen that balls 38 are arranged on a first bearing plane 42. The angle θ between bearing plane 42 and mounting surface 34 is machined to a precise value. Platform 40 is also mounted by low friction rotatable mountings, such as balls 43, to a flat platform 45 which is shown mounted to a surface 47, which may be a surface on a satellite. It is seen that balls 43 are arranged on a second bearing plane 49. The angle α between bearing plane 42 and bearing plane 42 is also machined to a precise value. Wedge-shaped platform 35 is rotatable, by balls 38, about an axis 50 perpendicular to plane 42. Wedge-shaped member 40 is rotatable by balls 43, about an axis 53 perpendicular to plane 49. Rotation of platforms 35 and 40 may be performed by mechanical devices, for example electric motors, such as stepper motors, shown as boxes 54 and 55, which may operate through mechanical connections, for example gears, shown as dashed lines 56 and 57 respectively. Motor 54 is shown mounted with respect to platform 40 by a connection shown as dashed line 58, and motor 55 is shown mounted with respect to base member 47 by a connection shown as dashed line 59. By this arrangement, platform 40 will rotate with respect to the base 47 and platform 35 will rotate with respect to platform 40. Of course, many alternate mounting and drive arrangements could be used and position feedback may be incorporated for exact positioning.

It is seen that with platform 35 not rotating, rotating platform 40 about axis 53 will cause pointing axis 32 to describe a cone 60 as seen in FIG. 4. The angle θ, between the pointing axis 32 and the axis 53 in FIG. 4, will be the same as angle θ in FIG. 2. Now, at an arbitrary position of platform 35 which, for example, places the pointing axis 32 at a position such as 62 in FIG. 4, if platform 35 is rotated about axis 50, the pointing axis 32 will describe a second cone 65 as seen in FIG. 4. The angle α, between the pointing axis 32 and the axis 50 in FIG. 4, will be the same as the angle α in FIG. 2. If angle α and angle θ are equal, then the vertices of cone 65 will lie along axis 53. Under these conditions, the pointing axis 32 may be placed anywhere within the area formed by all of the cones drawn through each of the points such as 62 around the cone 60 by proper rotation of platforms 35 and 40 as can be better seen in FIG. 5.

In FIG. 5, the central cone 60 is shown with 4 other cones 66, 67, 68 and 69 drawn the same size as cone 60 (since angle α and angle θ have been presumed equal) and thus a large cone identified in FIG. 5 by reference numeral 70 becomes the control space for pointing axis 32 and, with high accuracy, the pointing axis 32 may be placed anywhere in the large area formed by the cone 70. This is accomplished without the massive structures and the torque forming extensions which cause problems in FIG. 1. Furthermore, the heat conduction of platforms 35 and 40 through balls 38 and 43 to platform 45 and to the satellite 47 is very good, so that complicated provisions for heat reduction in the satellite may be avoided. It is also seen that θ and α may be machined to very small values, if desired.

It can be seen that in the center of FIG. 5, all of the circles come together at a point 75. This forms a singularity in the control range of the tilting action of the invention. More particularly, when the pointing axis is passing through point 75, then to move the pointing axis to a new location will require that the upper wedge 35 be first rotated to a new location before the lower and upper platforms 35 and 40 be rotated simultaneously to cause the pointing axis to point in the desired direction. At all other locations, the change to a new pointing direction can be accomplished by immediately and simultaneously rotating both platforms 35 and 40 a prescribed amount to cause the desired relocation. Only at the singularity point 75 will the rotation have to be non-simultaneous. In most cases this is not a problem since the time involved is only slightly greater when starting at the singularity position. However, if there is an application where this could be a problem, then the area for searching may be limited to a circle which does not include the singularity point 75. This can be seen in FIG. 6, where the area in which the system can be allowed to search is shown by smaller circle 80 shown, crosshatched, and it is seen that no part of circle 80 includes the point 75. If the area for search needs to be as large as circle 70 in FIG. 5, then the angle of the wedges can be made larger so that twice the diameters of circles 60 and 66 is equal to the diameter of the new circle 80. In other words, the use of the region close to the center 75 of the tilt space needs to be avoided unless there is adequate time to pass through it which in many, if not most, cases will be not be a problem. However, when high speed is required for responsive control, the region of interest must have some margin from the center 75 of circle 70 in FIG. 5.

FIG. 3 shows an alternate embodiment of the present invention that may be used to avoid rotation of the RWA 30 when the platform 35 rotates. In FIG. 3, all of the elements common to FIG. 1 have the same reference numerals. The difference is that the RWA 30 is no longer directly mounted on the first wedge-shaped platform 35 but, instead, is mounted on an additional platform 75 which, in turn, is mounted for rotation by balls 77 on the first wedge-shaped platform 35. The interior portion of the wedge-shaped platforms 35 and 40 has also been hollowed out to form a space 79. An elongated support member 80 is mounted on the flat platform 45 and extends upwardly through the space 79 to a pivot member 82. Pivot member is shown in the form of a bellows which is attached to the lower surface of additional platform 75 so as to allow pivotal motion of platform 75 about axes in the plane of balls 77, but to prevent rotation of platform 75 about an axis perpendicular to that plane. Alternate pivotal mountings such as a ball, a point or a cone fitting in a dimple could be used as long as rotation about an axis perpendicular to the plane of balls 77 is avoided. With the additional platform 75 rotatable on first wedge-shaped platform 35, the RWA 30 may be held free of rotation of the first wedge-shaped platform 35 by applying a brake, shown as box 85 connected to the additional platform 75 by a connection shown as dashed line 88. Thus, if RWA 30 is pointing in a proper position in one axis and needs to be tilted without rotation in a second axis, brake 85 may be applied. Of course, the same result can be obtained by rotation both wedge-shaped platforms 35 and 40 but with the addition of the additional platform 75, the result is made simpler.

It is therefore seen that we have provided a novel tilt table or pointing device that avoids the moment problems of the prior art, avoids the temperature dissipation of the prior art and is very accurate in positioning by small amounts. Many obvious modifications to the structure used in describing the preferred embodiments will occur to those skilled in the art. For example, an additional wedge-shaped platform may be used to provide a third degree of freedom in positioning. Also, the drive mechanism for rotating the platforms may vary with the desired use of the invention and the bearings, or preloaded duplexed pairs may be used. Also, the low friction rotation may be accomplished in alternate ways, such as roller bearings, to allow the desired rotation of the platforms. We, therefore, do not wish to be limited to the specific structures and methods used in connection with the preferred embodiments but intend that the attached claims be used in determining the scope of the invention.

What is claimed is:

1. Pointing apparatus comprising:

a first wedge-shaped platform mounted for rotation about a first axis on a surface;

a second wedge-shaped platform mounted for rotation on said first wedge-shaped platform about a second axis at an angle α with respect to the first axis, said second wedge-shaped platform having a mounting surface at an angle θ with respect to a plane perpendicular to the second axis; and pointing apparatus connected to the mounting surface.

2. Apparatus according to claim 1 wherein the pointing apparatus points along a third axis at an angle to said mounting surface, said third axis following a first conical surface when the first wedge-shaped platform is rotated.

3. Apparatus according to claim 2 wherein rotation of the second wedge-shaped platform at any rotational position of the first wedge-shaped member causes the third axis to follow a second conical surface.

4. Apparatus according to claim 1 further including an additional member attached to the pointing apparatus and mounted for rotation on the mounting surface of the second wedge-shaped platform.

5. Apparatus according to claim 4 further including a drive connected to said first and second wedge-shaped platforms to produce a predetermined amount of rotation therein.

6. Apparatus according to claim 4, wherein the first wedge-shaped platform rotates with respect to a stationary member, and further including an elongated pivot mounted on the stationary member and extending through a cavity in the first and second wedge-shaped platforms to the additional member.

7. Apparatus according to claim 6 wherein the elongated pivot comprises a bellows attached to the additional member.

8. Apparatus according to claim 1 further including a drive connected to said first and second wedge-shaped platforms to produce a predetermined amount of rotation therein.

9. The method of pointing a device in a desired direction comprising the steps of:

A. mounting the device on a first surface of a first wedge-shaped platform;

B. mounting the first wedged shaped platform on a first surface of a second wedge-shaped platform for rotation about a first axis on the first wedged shaped platform so that an angle between a perpendicular to the first axis and the first surface is of a predetermined value, $\theta$;

C. mounting the second wedge-shaped platform for rotation on a third surface about a second axis at an angle $\alpha$ with respect to the first axis; and D. selectively rotating the first and second second wedged-shaped platforms to positions to cause the device to point in the desired direction.

10. The method of claim 9 wherein Step A includes:

A1. rotatably mounting the device on the first surface.

* * * * *